US009600921B2

(12) United States Patent
Thomaszewski et al.

(10) Patent No.: US 9,600,921 B2
(45) Date of Patent: Mar. 21, 2017

(54) INTERACTIVE DESIGN SYSTEM FOR CHARACTER CRAFTING

(71) Applicant: Disney Enterprises, Inc., Burbank, CA (US)

(72) Inventors: Bernhard Thomaszewski, Zürich (CH); Vittorio Megaro, Zürich (CH); Markus Gross, Zürich (CH); Stelian Coros, Zürich (CH)

(73) Assignee: Disney Enterprises, Inc., Burbank, CA (US)

( * ) Notice: Subject to any disclaimer, the term of this patent is extended or adjusted under 35 U.S.C. 154(b) by 154 days.

(21) Appl. No.: 14/547,877

(22) Filed: Nov. 19, 2014

(65) Prior Publication Data

US 2016/0140747 A1    May 19, 2016

(51) Int. Cl.
*G06T 13/80* (2011.01)
*G06T 13/40* (2011.01)

(52) U.S. Cl.
CPC .............. *G06T 13/80* (2013.01); *G06T 13/40* (2013.01); *G06T 2213/08* (2013.01)

(58) Field of Classification Search
CPC ............................ G06T 13/40; G06F 17/5086
See application file for complete search history.

(56) References Cited

U.S. PATENT DOCUMENTS

| 2012/0223953 A1* | 9/2012 | Osuna ..................... G06T 13/40 345/473 |
| 2013/0231933 A1 | 9/2013 | Hajishirzi |
| 2013/0235043 A1* | 9/2013 | Mueller ................. G06T 13/40 345/473 |
| 2014/0316757 A1 | 10/2014 | Coros |

OTHER PUBLICATIONS

Shao, Tianjia, et al. "Interpreting concept sketches." ACM Transactions on Graphics (TOG) 32.4 (Jul. 2013): 56.*
Zhu, Lifeng, et al. "Motion-guided mechanical toy modeling." ACM Trans. Graph. 31.6 (2012): 127.*

* cited by examiner

*Primary Examiner* — Daniel Hajnik
(74) *Attorney, Agent, or Firm* — Farjami & Farjami LLP

(57) ABSTRACT

There are provided an interactive design system and method for character crafting. An example system includes a memory storing a machine software application and a processor configured to execute the machine software application to receive a plurality of components for a character, the plurality of components including at least a first component and a second component, receive a movement for the character, the movement including a first pose for the character and a second pose for the character, calculate a linkage for the first component and the second component based on the movement, and generate an updated character by connecting the second component to the first component using the linkage. The linkage may include at least one of a connector, a trimmer, and a propagation mechanism.

12 Claims, 9 Drawing Sheets

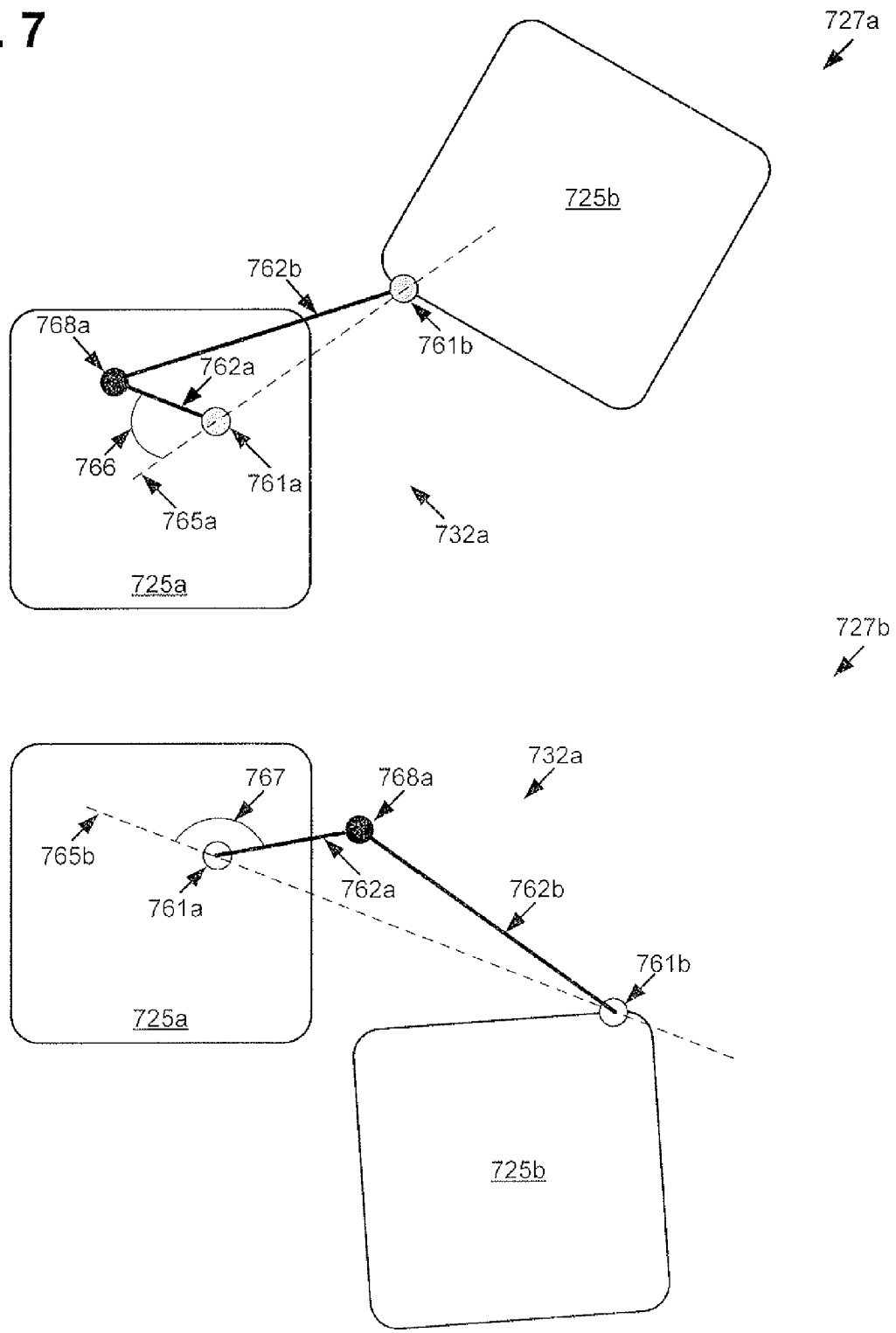

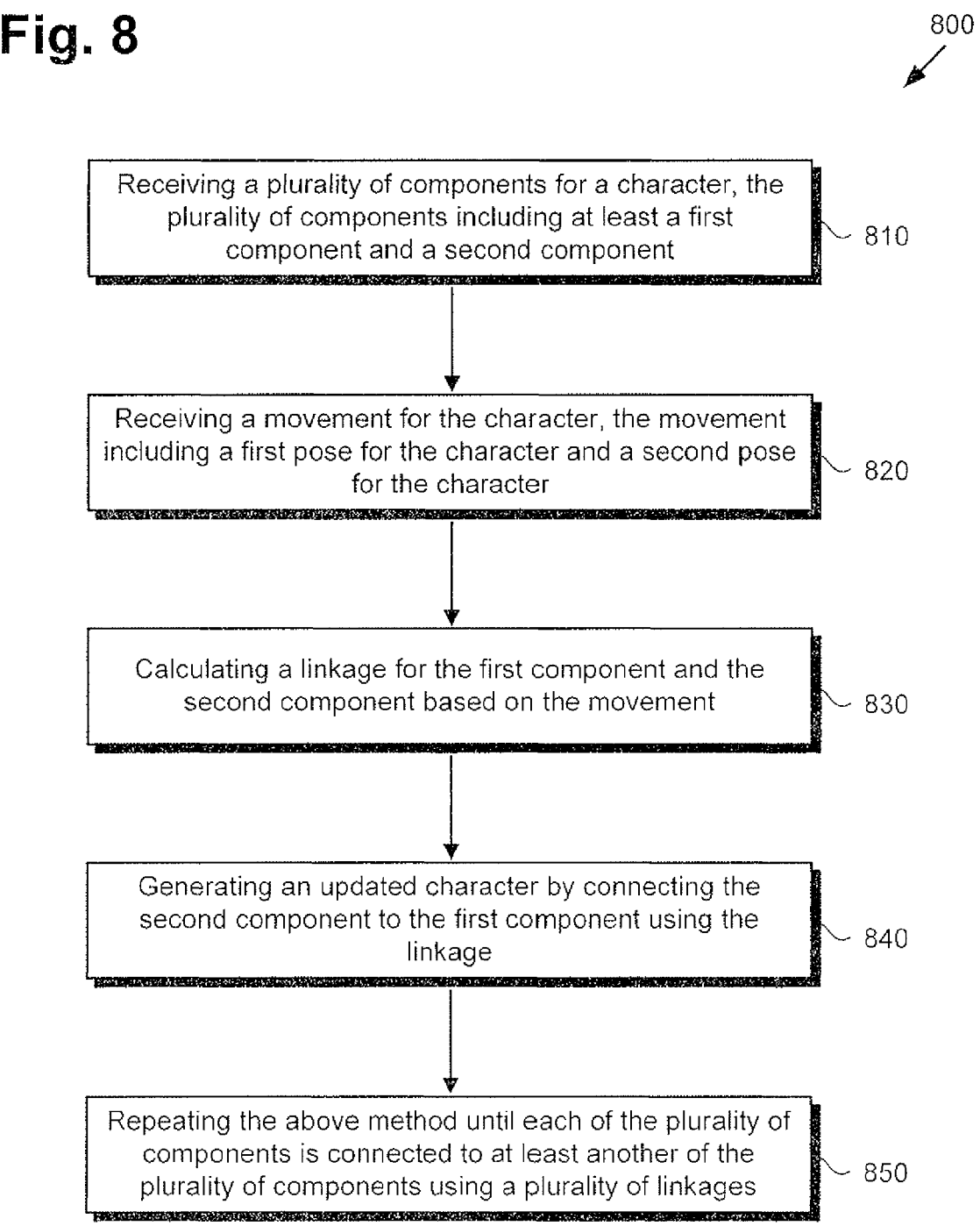

INTERACTIVE DESIGN SYSTEM FOR CHARACTER CRAFTING

BACKGROUND

Inexpensive fabrication devices are making it fun to fabricate tangible, physical printed characters on what could soon become ubiquitous home three-dimensional printers. However, without motion, these printed characters are static and lifeless, serving simply as snapshots. As such, a drive to enhance the expressiveness and storytelling possibilities of printed characters motivates the onset to search for new ways to bring life to printed characters, such as by giving motion to the printed characters. However, to give motion to printed characters, users need visual design tools that will help assist in the expressing of their creative visions, while at the same time hiding or alleviating the myriad technical difficulties that arise in the creation of the printed characters.

SUMMARY

The present disclosure is directed to an interactive design system for character crafting, substantially as shown in and/or described in connection with at least one of the figures, as set forth more completely in the claims.

BRIEF DESCRIPTION OF THE DRAWINGS

FIG. 7 presents an example of avoiding singularities between two connected components of a character, according to one implementation of the present disclosure.

FIG. 8 shows a flowchart illustrating a method for character crafting, according to one implementation of the present disclosure.

DETAILED DESCRIPTION

Figure 1:
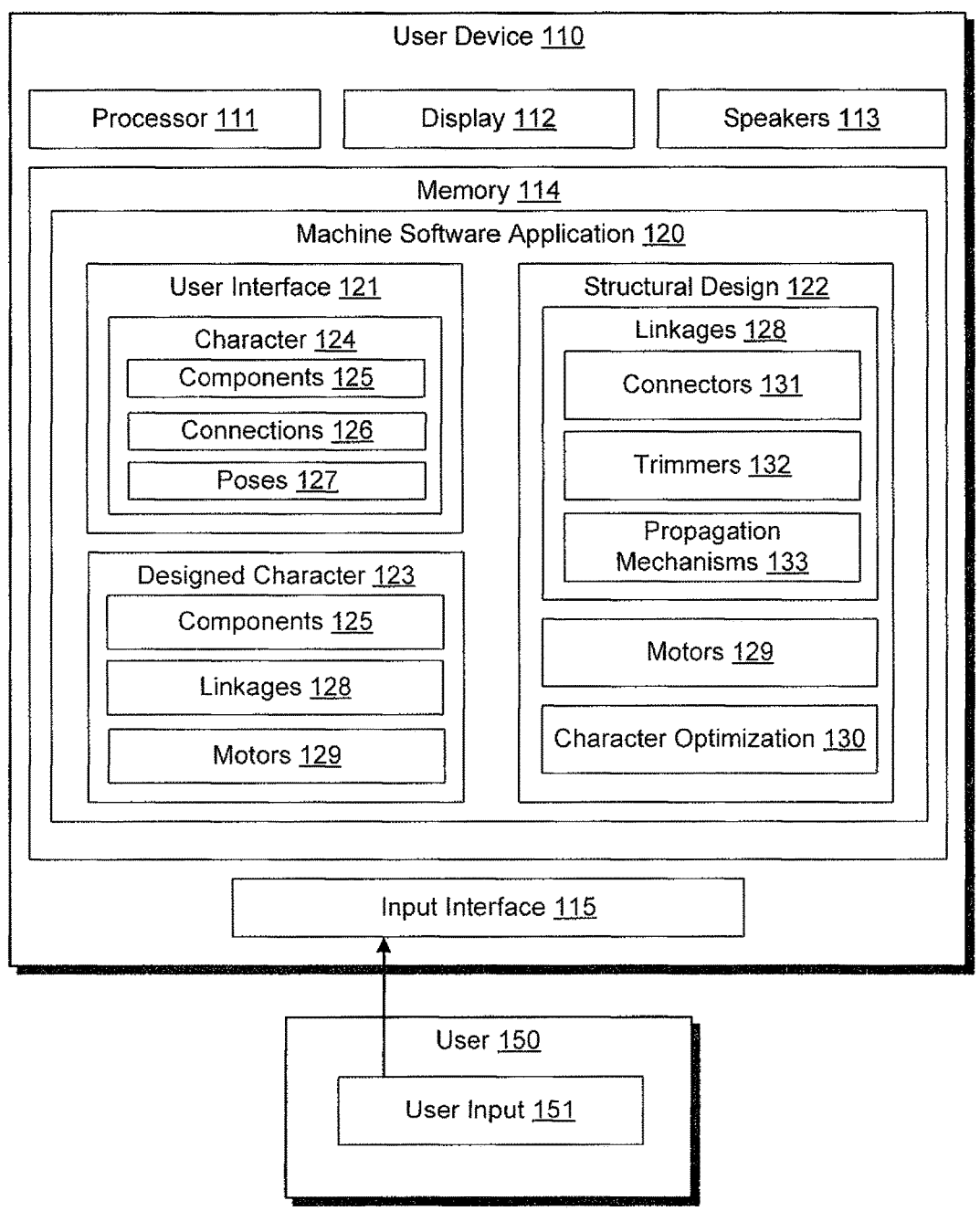
FIG. 1 presents an interactive design system for character crafting, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 presents an interactive design system for character crafting, according to one implementation of the present disclosure. System 100 of FIG. 1 includes user device 110 and user 150. User device 110 includes processor 111, display 112, speakers 113, memory 114, and input interface 115. Memory 114 includes software application 120, which includes user interface 121, structural design 122, and designed character 123. User interface 121 includes character 124, which includes components 125, connections 126, and poses 127. Structural design 122 includes linkages 128, motors 129, and character optimization 130. Linkages 128 include connectors 131, trimmers 132, and propagation mechanisms 133. Designed character 123 includes components 125, linkages 128, and motors 129. User 150 includes user input 151.

User device 110 may include a personal computer, a server, a mobile phone, a tablet, or any other device capable of executing software application 120. As shown in FIG. 1, user device 110 includes display 112 and input interface 115. Input interface 115 may include, for example, a keyboard, a mouse, a game controller, a touch-screen input, a thermal and/or electrical sensor, or any other device capable of accepting user input 151 for use with user device 110. Display 112 may include a liquid crystal display ("LCD"), a light-emitting diode ("LED"), an organic light-emitting diode ("OLED"), or another suitable display screen built into user device 110 that performs a physical transformation of signals to light. In some implementations, display 112 may also be touch sensitive and may serve as input interface 115.

Also illustrated in FIG. 1, user device 110 includes processor 111 and memory 114. Processor 111 may be configured to access memory 114 to store received input or to execute commands, processes, or programs stored in memory 114, such as software application 120. Processor 111 may correspond to a processing device, such as a microprocessor or similar hardware processing device, or a plurality of hardware devices. Memory 114 is a sufficient memory capable of storing commands, processes, and programs for execution by processor 111.

Also illustrated in FIG. 1, user device 110 includes software application 120. User 150 of user device 110 may use software application 120 to quickly and intuitively create mechanical characters that perform desired periodic motions. In order to create mechanical characters that perform desired periodic motions, software application 120 first provides user 150 with user interface 121, which allows user 150 to create an initial design for the mechanical character, such as character 124. For example, user interface 121 may allow user 150 to create character 124 to include a mechanical person, animal, machine, or any other mechanical character or object that performs a desired periodic motion. As illustrated in FIG. 1, user 150 may create character 124 using components 125, connections 126, and poses 127.

Components 125 may include each of the rigid parts that make up character 124. For example, if character 124 includes to a mechanical person, components 125 may include the head, arms, legs, and body of character 124. Connections 126 may include instructions provided by user 150 specifying how components 125 of character 124 are to be connected together. For example, and using the example above where character 124 includes to a mechanical person, connections 126 may specify that the head is to be connected to a top part of the body, each of the arms is to be connected to one side of the body, and the legs are to be connected to the bottom of the body. Finally, poses 127 may include two extreme poses for character 124 that work together to define the periodic motion of character 124.

For example, and still using the example above where character 124 includes to a mechanical person, poses 127 may be used to define the periodic motion of the mechanical person. In such an example, if user 150 wants the mechanical person to include a jumping motion, user 150 may define a first of poses 127 for the mechanical character to include the mechanical character with its legs bent, as if the mechanical character was getting ready to jump. User 150 may then define a second of poses 127 for the mechanical person to include the mechanical person with its legs straight, as if the mechanical character had just finished the jumping motion and was in the air. The defined periodic motion for the mechanical character for the two poses 127 would then include the legs of the mechanical character making the jumping motion.

Also illustrated in FIG. 1, software application 120 includes structural design 122. Software application 120 uses structural design 122 to automatically compute parameters for linkages 128, where linkages 128 are used to connect the different components 125 of character 124 together in such a way that character 124 obtains the desired periodic motion of poses 127 as defined by user 150. As illustrated in FIG. 1, linkages 128 include connectors 131, trimmers 132, and propagation mechanisms 133.

Figure 3A:
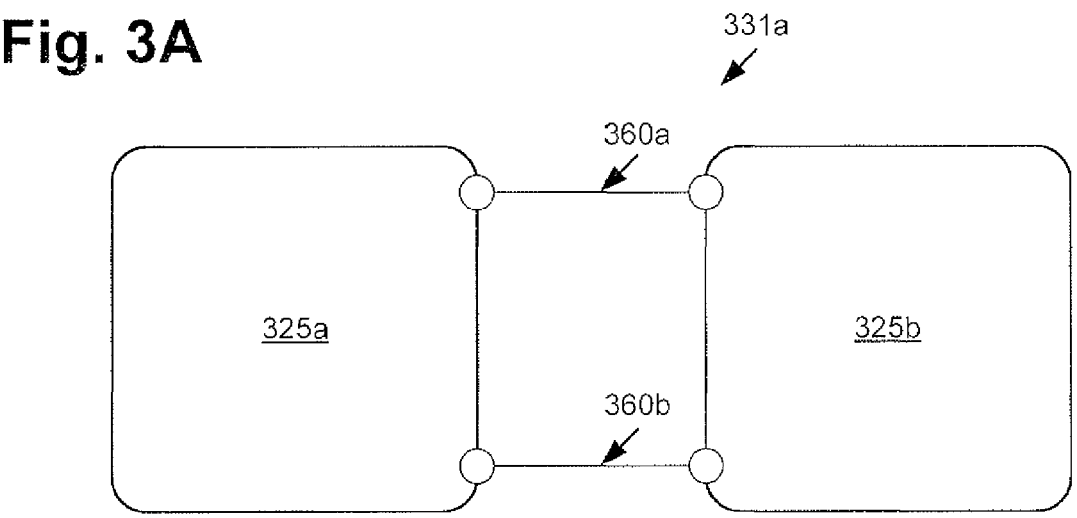
FIG. 3A presents a first example of a connector that may be used to connect components of a character together, according to one implementation of the present disclosure.
Figure 3B:
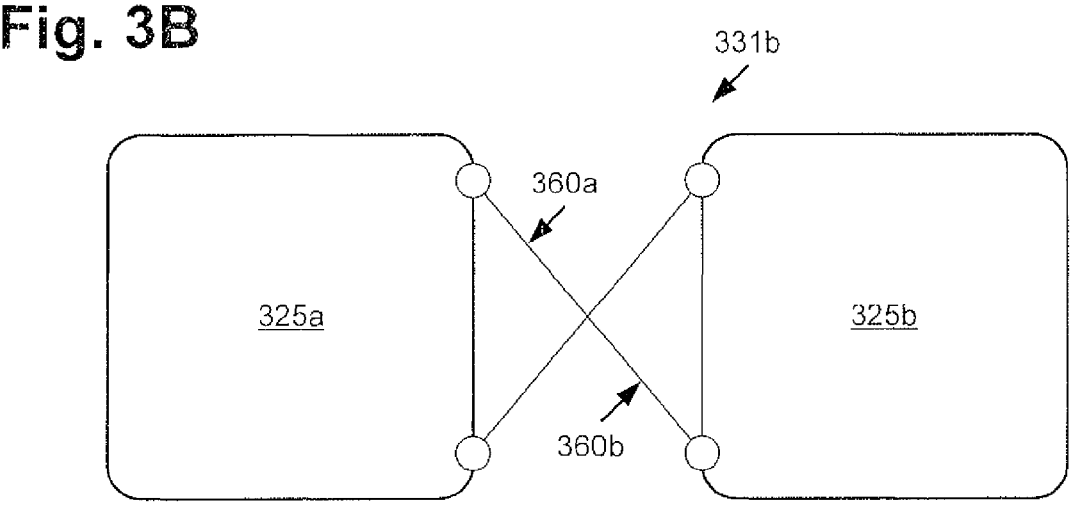
FIG. 3B presents a second example of a connector that may be used to connect components of a character together, according to one implementation of the present disclosure.
Figure 3C:
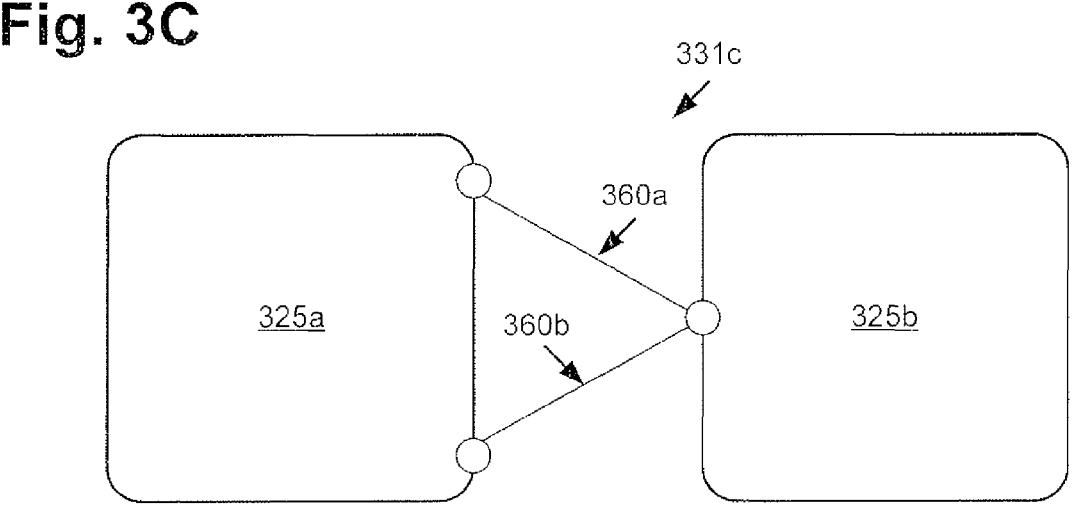
FIG. 3C presents a third example of a connector that may be used to connect components of a character together, according to one implementation of the present disclosure.

Connectors 131 are used to connect two components 125 of character 124 together. As such, connectors define how the two components 125 move relative to one another. In one implementation, connectors 131 include two bars, with the endpoints of each of the bars being attached to one of the two components 125. The relative positions of these endpoints then define the type of connection that is created between the two components 125 using connectors 131. For example, and as illustrated in FIGS. 3A-3C, connectors 131 may include, but are not limited to, two parallel bars connecting the two components 125 together, two crossed bars connecting the two components 125 together, or two bars that come together at a point on one of the two components 125 to form a pin connection.

Figure 4A:
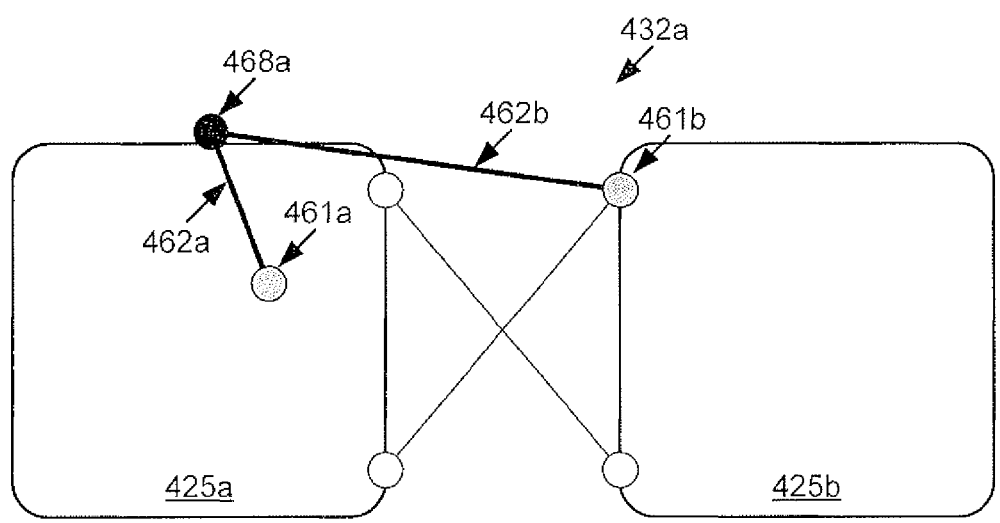
FIG. 4A presents an example of a trimmer that may be used to connect components of a character together, according to one implementation of the present disclosure.
Figure 4B:
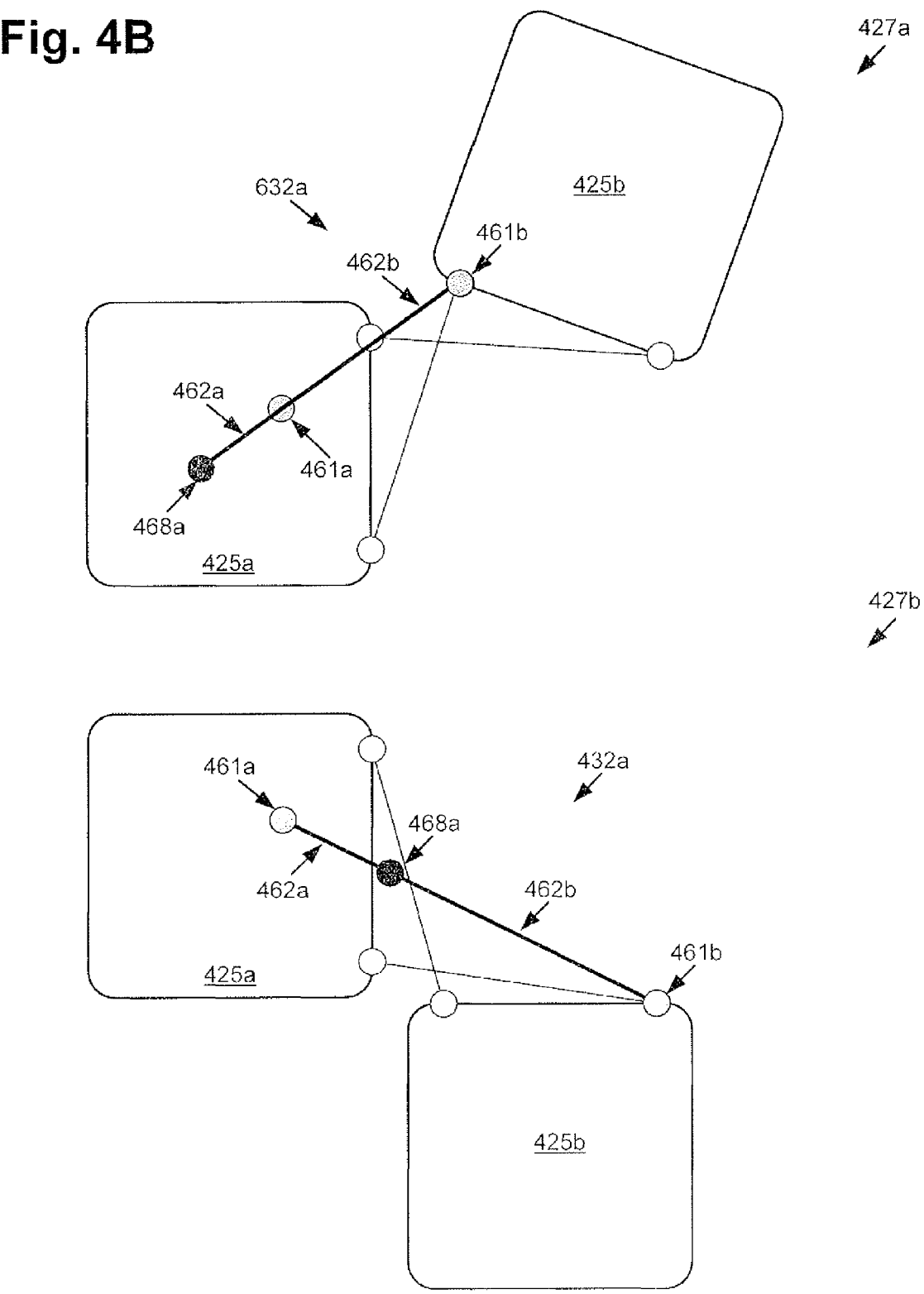
FIG. 4B presents an example of how to calculate parameter for a trimmer, according to one implementation of the present disclosure.

Trimmers 132 are used to limit the relative motion between two components 125 to a desired range, where the desired range is based on poses 127 provided by user 150. In one implementation, trimmers 132 include two interconnected bars with a first endpoint connected to one of the two components 125 and a second endpoint connected to the other of the two components 125. As illustrated in FIGS. 4A and 4B, the two bars of trimmers 132 are interconnected to each other using a pin so that the two bars are able to rotate with respect to one another.

Propagation mechanisms 133 are used to transmit the motion of one of the two components 125 to the other of the two components 125. In one implementation, propagation mechanisms 133 include two interconnected bars with a first endpoint connected to one of the two components 125 and a second endpoint connected to the other of the two components 125. The two bars of propagation mechanisms 133 are interconnected to each other using a pin so that the two bars are able to rotate with respect to one another. As illustrated in FIGS. 5A and 5B, and described in more detail below, propagation mechanisms 133 may further be used to transmit the motion from the two connected components 125 to a third of components 125.

As shown in FIG. 1, structural design 122 includes motors 129. Software application 120 may further use structural design 122 to add motors 129 to one or more components 125 of character 124, where motors 129 are used to generate a motion between components 125. As such, motors 129 may be used as a replacement to propagation mechanisms 133 to transmit motion from one of two connected components 125 to the other of the two connected components 125. In one implementation, character 124 may only include a single motor from motors 129 that drives all of components 125 of character 124. In such an implementation, linkages 128 between components 125 will transmit the motion generated by the single motor to all of components 125 such that character 124 performs the desired periodic motion between poses 127 as defined by user 150.

Figure 6:
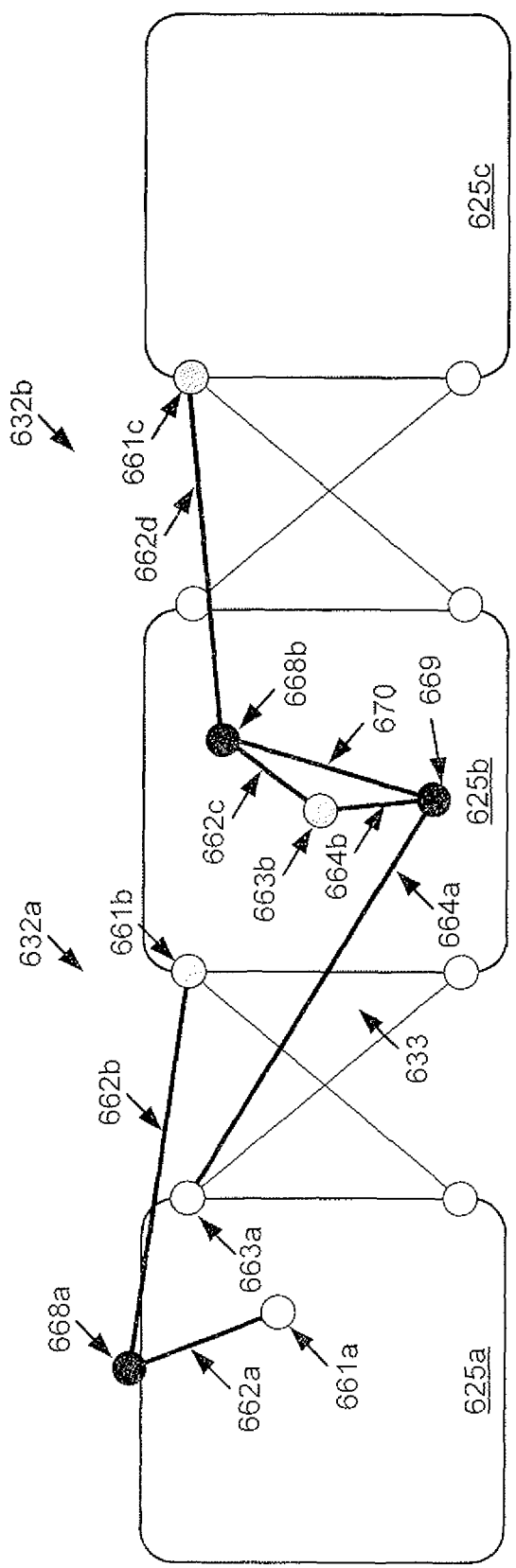
FIG. 6 presents an example of connecting a trimmer to a propagation mechanism to generate motion in a third component, according to one implementation of the present disclosure.

Structural design 122 includes character optimization 130. Structural design 122 may use character optimization 130 when computing parameters for linkages 128 to avoid singularities between components 125 of character 124. As illustrated in FIG. 6, and discussed in greater detail below, character optimization 130 inputs restrictions into the calculations for generating trimmers 132 and propagation mechanisms 133 for character 124 to avoid the singularities between components 125 of character 124.

Also illustrated in FIG. 1, software application 120 includes designed character 123. Designed character 123 may correspond to character 124 designed by user 150, except that designed character 123 now includes linkages 128 connecting components 125 of character 124 together and at least one of motors 129 driving the periodic motion of character 124. As such, designed character 123 is able to perform the desired periodic motion as defined by user 150 from poses 127. The desired periodic motion is driven by the at least one of motors 129 of designed character 123 and transmitted throughout each of components 125 using linkages 128.

Figure 2A:
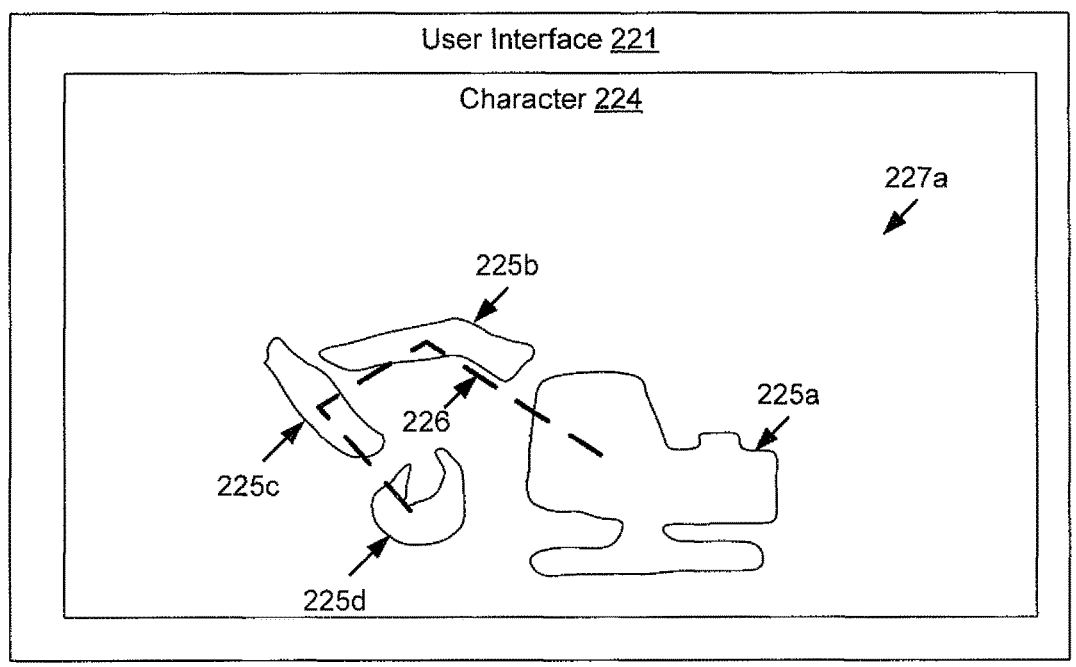
FIG. 2A presents a first example of a user interface that may be used by a user to design a character including a first pose, according to one implementation of the present disclosure.

FIG. 2A presents a first example of a user interface that may be used by a user to design a character including a first pose, according to one implementation of the present disclosure. FIG. 2A includes user interface 221, which includes character 224.

Character 224 includes component 225a, component 225b, component 225c, and component 225d, collectively referred to as components 225, connections 226, and first pose 227a. With regard to FIG. 2A, user interface 221, character 224, components 225, connections 225, and first pose 227a correspond respectively to user interface 121, character 124, components 125, and one of poses 127 from FIG. 1. Furthermore, many features of FIG. 1 have been left out of FIG. 2A for clarity purposes.

A user may be using a software application to design character 224 on user interface 221, such as user 150 using software application 120 to design character 124 on user interface 121 from FIG. 1. In the implementation of FIG. 2A, the user has designed character 224 to include a tractor that is made up four different components 225. As such, the user may have drawn the four different components 225 using an input interface on a mobile device that is running the software application, such as input interface 115 on mobile device 110 running software application 120 from FIG. 1.

As shown in FIG. 2A, the user has drawn connections 226 to specify which of components 225 are to be connected together. As illustrated in the implementation of FIG. 2A, the user has connected component 225*a* to component 225*b*, component 225*b* to component 225*c*, and component 225*c* to component 225*d*. By drawing connections 226 on components 225 of character 224, the user has told the software application which components 225 are to be connected together using linkages.

Also illustrated in FIG. 2A, the user has placed character 224 in a first pose 227*a*. As discussed above, the user places character 224 into two extreme poses that together define the periodic motion of character 224. As such, the user in the implementation of FIG. 2A may have placed character 224 in pose 227*a*, which corresponds to the first of the two extreme poses for character 224. The software application will thus compute parameters for the linkages of character 224 in such a way that character 224 makes pose 227*a* each time character 224 performs an entire periodic motion.

Figure 2B:
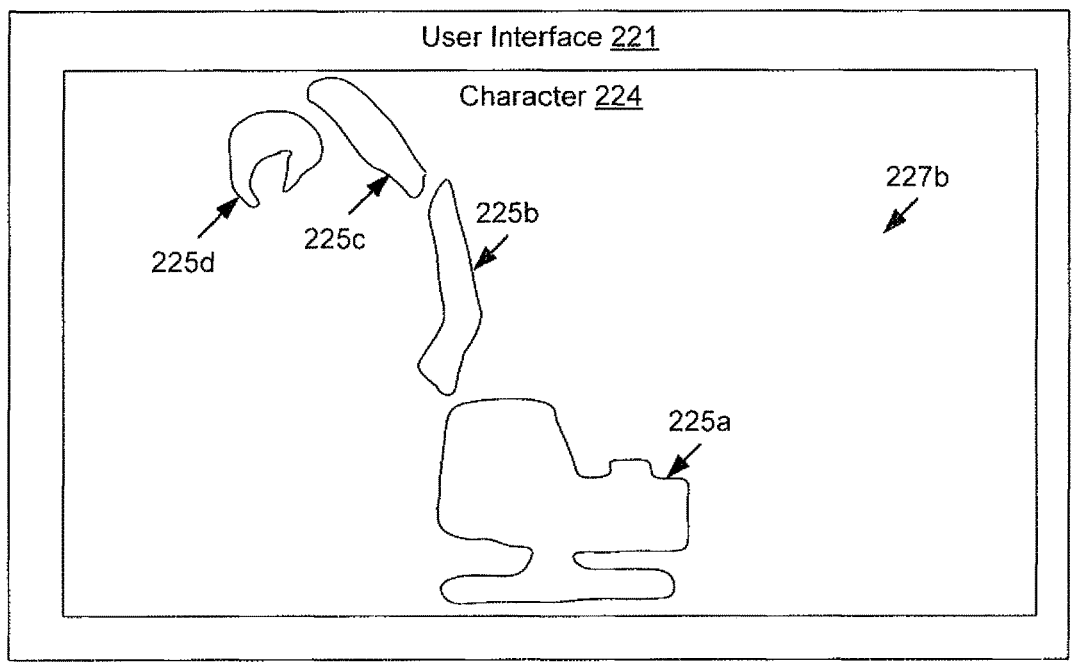
FIG. 2B presents a second example of a user interface that may be used by a user to design a character including a second pose, according to one implementation of the present disclosure.

FIG. 2B presents a second example of a user interface that may be used by a user to design a character including a second pose, according to one implementation of the present disclosure. FIG. 2B includes user interface 221, which includes character 224. Character 224 includes component 225*a*, component 225*b*, component 225*c*, component 225*d*, and pose 227*b*. With regard to FIG. 2B, pose 227*b* corresponds to one of poses 127 from FIG. 1.

In the implementation of FIG. 2B, the user may now have placed character 224 into pose 227*b*, which corresponds to the second of the two extreme poses that are used to define the periodic motion of character 224. As such, the software application will compute parameters for the linkages of character 224 in such a way that character 224 further makes pose 227*b* each time character 224 performs an entire periodic motion. Furthermore, now that the user has drawn components 225, connections 226, pose 227*a*, and pose 227*b* for character 224, the software application will compute the parameters for the linkages of character 224.

FIG. 3A presents a first example of a connector that may be used to connect components of a character together, according to one implementation of the present disclosure. FIG. 3A includes component 325*a* and component 325*h*, collectively referred to as components 325, connected together using connector 331*a*. Connector 331*a* includes connector bar 360*a* and connector bar 360*b*, collectively referred to as collector bars 360. With regard to FIG. 3A, components 325 and connector 331*a* correspond respectively to components 125 and one of connectors 131 from FIG. 1.

In the implementation of FIG. 3A, a software application may have connected components 325 together using connector 331*a*. Connector 331*a* includes two parallel connector bars 360, with a first end of each of connector bars 360 connected to component 325*a* and a second end of each of connector bars 360 connected to component 325*b*.

FIG. 3B presents a second example of a connector that may be used to connect components of a character together, according to one implementation of the present disclosure. FIG. 3B includes component 325*a*, component 325*b*, and connector 331*b*. Connector 331*b* includes connector bar 360*a* and connector bar 360*b*. With regard to FIG. 3B, connector 331*b* corresponds to one of connectors 131 from FIG. 1.

As illustrated in the implementation of FIG. 3B, a software application may have now connected components 325 together using connector 331*b*. Connector 331*b* includes two connector bars 360 that cross each other, with a first end of each of connector bars 360 connected to component 325*a* and a second end of each of connector bars 360 connected to component 325*b*.

FIG. 3C presents a third example of a connector that may be used to connect components of a character together, according to one implementation of the present disclosure. FIG. 3C includes component 325*a*, component 325*b*, and connector 331*c*. Connector 331*c* includes connector bar 360*a* and connector bar 360*b*. With regard to FIG. 3B, connector 331*c* corresponds to one of connectors 131 from FIG. 1.

In the implementation of FIG. 3C, the software application may have now connected components 325 together using connector 331*c*. Connector 331*c* includes two connector bars 360, with a first end of each of the two connector bars 360 connected to component 325*a* and a second end of each of connector bars 360 connected to component 325*b* at a point.

It should be noted that in one implementation, the software application will automatically infer the type of connection (using connectors 331*a*, 331*b*, and 331*c* from FIGS. 3A-3C) that will be used between components 325 and the attachment points for the connection based on the two extreme poses provided by the user. In such an implementation, after the user has provided the first pose for the character and is inputting the second pose, the software application will determine if the second pose can reasonably be approximated and if so, which type of connection is best for the two components 325.

For example, in order to determine if the second pose can reasonably be approximated, a sampling-based approach is used. For the regions on the two components 325 indicated by the user for connection, sets of regularly-spaced sample points are created. Randomly selected pairs from two sets of the sample points are then selected and distances $d^1$ and $d^2$ for the two sets are computed between the two poses. A fixed number of these pairs is generated and ordered in a list according to the smallest distance variation $d^1/d^2$. Finally, the list is processed to find two edges with the lowest possible variation in distance while ruling out degenerate cases such as a parallel couplings that fold over to a cross coupling. This process thus provides interactive feedback to the user on the feasibility of the second pose while the user is inputting the second pose.

FIG. 4A presents an example of a trimmer that may be used to connect components of a character together, according to one implementation of the present disclosure. FIG. 4A includes trimmer 432*a* and component 425*a* and component 425*b*, collectively referred to as components 425. Trimmer 432*a* includes connection point 461*a*, connection point 461*b*, trimmer bar 462*a*, trimmer bar 462*b*, and pin 468*a*. With respect to FIG. 4A, it should be noted that trimmer 432*a* and components 425 correspond respectively to one of trimmers 132 and components 125 from FIG. 1. Furthermore, components 425 correspond to components 325 from FIGS. 3A-3C.

As illustrated in the implementation of FIG. 4A, the software application has now connected components 425 together using trimmer 432*a*. Trimmer 432*a* includes trimmer bar 461*a* connected to trimmer bar 461*b* using pin 468*a*.

Trimmer 432a further includes connection point 461a connecting trimmer bar 461a to component 425a and connection point 461b connecting trimmer bar 461b to component 425b, where each of connection point 461a and connection point 461b includes a pin connection.

Trimmer 432a may be used to limit the relative motion between components 425 to a desired range, where the desired range is based on the poses provided by the user. The software application computes parameters for trimmer 432a automatically based on the two poses, where the parameters includes locations for trimmer connection point 461a and trimmer connection point 461b, and the lengths of trimmer bar 462a and trimmer bar 462b.

FIG. 4B presents an example of how to calculate parameter for a trimmer, according to one implementation of the present disclosure. FIG. 4B includes component 425a, component 425b, and trimmer 432a. Trimmer 432a includes connection point 461a, connection point 461h, trimmer bar 462a, trimmer bar 462b, and pin 468a. FIG. 4B further includes pose 427a and pose 427b, collectively referred to as poses 427, for components 425. With regard to FIG. 4B, it should be noted that poses 427 correspond to poses 127 from FIG. 1.

In order to compute parameters for trimmer 432a, the software application first denotes a scalar that parameterizes the motion of the character between pose 427a and pose 427b. Next, trimmer connection point 461a and trimmer connection point 461b are determined such that the world-space distance between trimmer connection point 461a and trimmer connection point 461b increases monotonically between pose 427a and pose 427b. Finally, the lengths of trimmer bar 462a and trimmer bar 462b are calculated such that the length of trimmer bar 462a minus the length of trimmer bar 462l) equals the world-space distance between trimmer connection point 461a and connection point 461b at pose 427a, and the length of trimmer bar 462a plus the length of trimmer bar 462b equals the world-space distance between trimmer connection point 461a and connection point 461b at pose 427b. For example, lengths for trimmer bar 462a and trimmer bar 462b are computed using collinearity conditions.

Figure 5:
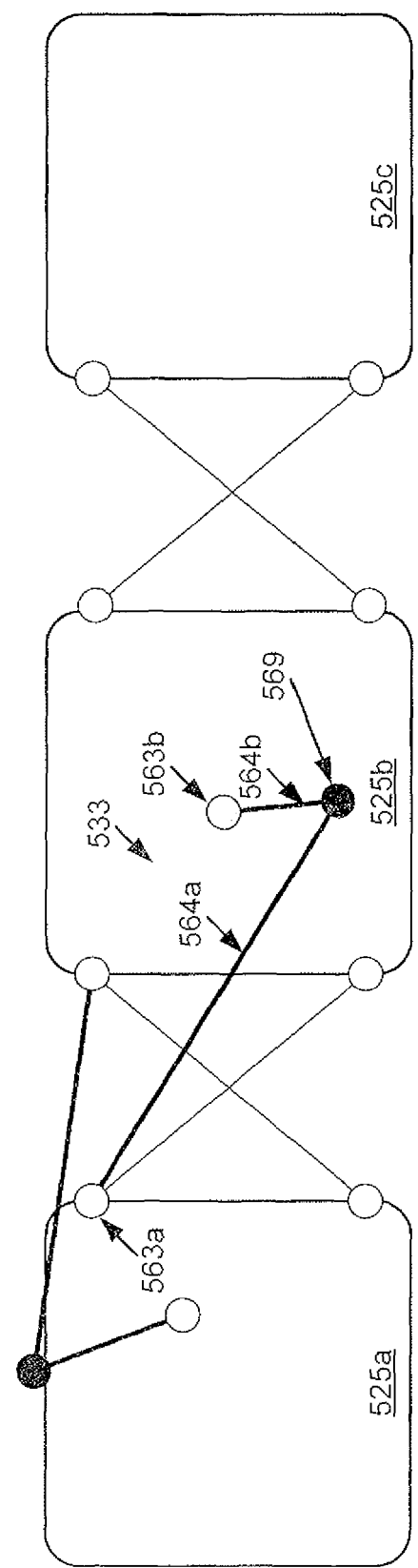
FIG. 5 presents an example of a propagation mechanism that may be used to connect components of a character together, according to one implementation of the present disclosure.

FIG. 5 presents an example of a propagation mechanism that may be used to connect components of a character together, according to one implementation of the present disclosure. FIG. 5 includes propagation mechanism 533 and component 525a, component 525b, and component 525c, collectively referred to as components 525. Propagation mechanism 533 includes connection point 563a, connection point 563b, propagation bar 564a, propagation bar 564b, and pin 569. With regard to FIG. 5A, it should be noted that propagation mechanism 533 and components 525 correspond respectively to one of propagation mechanisms 133 and components 125 from FIG. 1. It should further be noted that component 525a and component 525b corresponds respectively to component 425a and component 425b from FIGS. 4A and 4B.

As illustrated in the implementation of FIG. 5, component 525a is now connected to component 252b using propagation mechanism 533. Propagation mechanism 533 includes propagation bar 564a connected to propagation bar 564b using pin 569. Propagation mechanism 533 further includes connection point 563a connecting propagation bar 564a to component 525a and connection point 563b connecting propagation bar 564b to component 525h, where each of connection point 563a and connection point 563b includes a pin connection.

Propagation mechanism 533 may be used to transmit the motion from component 525a to component 525b. In order to compute parameters for propagation mechanism 533, a similar method is used as described above for computing parameters for trimmer 432a. For example, the software application first determines connection point 563a and connection point 563b such that a world-space distance between connection point 563a and connection point 563b increases monotonically between the two extreme poses, such as pose 427a and pose 427b from FIG. 4B. Next, lengths for propagation bar 564a and propagation bar 564b are computed using collinearity conditions.

It should be noted that propagation bar 564b of propagation mechanism 533 will now be passively actuated by trimmer bar 462a from FIGS. 4A and 4B. For example, rotating trimmer bar 462a around connection point 461a will induce a corresponding rotation of propagation bar 564b around connection point 563b.

FIG. 6 presents an example of connecting a trimmer to a propagation mechanism to generate motion in a third component, according to one implementation of the present disclosure. FIG. 6 includes trimmer 632a and trimmer 632b, collectively referred to as trimmers 632, propagation mechanism 633, and component 625a, component 625b, and component 625c, collectively referred to as components 625. Trimmer 632a includes connection point 661a, connection point 661b, trimmer bar 662a, trimmer bar 662b, and pin 668a. Trimmer 632b includes connection point 661c, trimmer bar 662c, trimmer bar 662d, connection point 663b, and pin 668b. Propagation mechanism 633 includes connection point 663a, connection point 663b, propagation bar 664a, propagation bar 664b, and pin 669. FIG. 5B further includes bar 670 connecting trimmer 632b to propagation mechanism 633.

With regard to FIG. 6, it should be noted that components 625, trimmers 632, and propagation mechanism 633 correspond respectively to components 125, trimmers 132, and one of propagation mechanisms 133 from FIG. 1. Furthermore, trimmer 632a, connection point 661a, connection point 661b, trimmer bar 662a, trimmer bar 662b, and pin 668a correspond respectively to trimmer 432a, connection point 461a, connection point 461b, trimmer bar 462a, trimmer bar 462b, and pin 468a from FIGS. 4A and 4B. Finally, propagation mechanism 633, connection point 663a, connection point 663b, propagation bar 664a, propagation bar 664b, and pin 669 correspond respectively to propagation mechanism 533, connection point 563a, connection point 563b, propagation bar 564a, propagation bar 564b, and pin 569 from FIG. 5.

As illustrated in FIG. 6, component 625c has now been connected to component 625a and component 625b. In order to transfer the motion from component 625a and component 625b to component 625c, trimmer 632b has been used to connect component 625b to component 625c, where trimmer 632b transfers the motion to component 625c. For example, and as illustrated in FIG. 6, trimmer 632b connects to propagation mechanism 633. As discussed above, propagation mechanism 633 is used to transfer motion to other components of a character. As such, trimmer 632b takes the motion from propagation mechanism 633 and transfers that motion to component 625c.

For example, trimmer bar 662c of trimmer 632b is connected to connection point 663b of propagation mechanism 633. Furthermore, bar 670 is used to connect pin 669 of propagation mechanism to pin 668b of trimmer 632b. By connected trimmer 632b to propagation mechanism 633 using such a connection, the motion from propagation mechanism 633 is transferred to trimmer 632b and finally to component 625c.

It should be noted that the parameters for trimmer 632b are computed similarly as the parameters for trimmer 632a described above with regard to FIG. 4B. For example, when computing the parameters for trimmer 632b, the software application determines connection point 661c such that the world-space distance between connection point 663b and connection point 661c increases monotonically between the two extreme poses of the character. Next, the software application determines the lengths of trimmer bar 662c and trimmer bar 662d using collinearity conditions.

FIG. 7 presents an example of avoiding singularities between two connected components of a character, according to one implementation of the present disclosure. FIG. 7 includes component 725a and component 725b, collectively referred to as components 725, and trimmer 732a. Trimmer 732a includes connection point 761a, connection point 761b, trimmer bar 762a, trimmer bar 762b, and pin 768a. FIG. 7 further includes pose 727a and pose 727b, collectively referred to as poses 727, for components 725. Finally, FIG. 7 includes safety angle 766 and safety angle 767.

With regard to FIG. 7, it should be noted that components 725, poses 727, and trimmer 732a correspond respectively to components 125, poses 127, and one of trimmers 132 from FIG. 1. It should further be noted that components 725, poses 727, trimmer 732a, connection point 761a, connection point 761b, trimmer bar 762a, trimmer bar 762b, and pin 768a correspond respectively to components 425, poses 427, trimmer 432a, connection point 461a, connection point 461b, trimmer bar 462a, trimmer bar 462b, and pin 468a from FIG. 4B.

In order to avoid singularities between components 725, the software application may now compute parameters for trimmer 732a such that trimmer bar 762a and trimmer bar 762b are not collinear. Instead, the software application may require trimmer bar 762a and trimmer bar 762b to stay safety angle 766 and safety angle 767 away from each other, where safety angle 767=(Pi−766). The software application then uses safety angle 766 and safety angle 767 to compute the length of trimmer bar 762a and trimmer bar 762b.

FIG. 8 shows a flowchart illustrating a method for character crafting, according to one implementation of the present disclosure. The approach and technique indicated by flowchart 800 are sufficient to describe at least one implementation of the present disclosure, however, other implementations of the disclosure may utilize approaches and techniques different from those shown in flowchart 800. Furthermore, while flowchart 800 is described with respect to FIGS. 1, 2A, and 2B, the disclosed inventive concepts are not intended to be limited by specific features shown and described with respect to FIGS. 1, 2A, and 2B. Furthermore, with respect to the method illustrated in FIG. 8, it is noted that certain details and features have been left out of flowchart 800 in order not to obscure the discussion of inventive features in the present application.

Referring now to flowchart 800 of FIG. 8, flowchart 800 (at 810) includes receiving a plurality of components for a character, the plurality of components including at least a first component and a second component. For example, processor 111 of user device 110 may execute machine software application 120 to receive components 125/225 for character 124/224, where components 125/225 include at least a first component 225a and a second component 225b.

As discussed above, user 150 may use user interface 121/221 to design character 124/224 to include components 125/225.

Flowchart 800 (at 820) continues with receiving a movement for the character, the movement including a first pose for the character and a second pose for the character. For example, processor 111 of user device 110 may execute machine software application 120 to receive a movement for character 124/224, the movement including pose 227a for character 124/224 and pose 227b for character 124/224. As discussed above, user 150 may use user interface 121/221 to generate the movement for character 124/224 by inputting pose 227a and pose 227b for character 124/224.

Flowchart 800 (at 830) continues with calculating a linkage for the first component and the second component based on the movement. For example, processor 111 of user device 110 may execute machine software application 120 to calculate one of linkages 128 for component 225a and component 225b based on the movement. As discussed above, linkages 128 for components 125/225 may include at least one of connectors 131, trimmers 132, and propagation mechanisms 133.

Flowchart 800 (at 840) continues with generating an updated character by connecting the second component to the first component using the linkage. For example, processor 111 of user device 110 may execute machine software application 120 to generate designed character 123 by connected component 225b to component 225a using the one of linkages 128.

Flowchart 800 (at 850) continues with repeating the above method until each of the plurality of components is connected to at least another of the plurality of components using a plurality of linkages. For example, processor 111 of user device 110 may execute machine software application 120 to connect each of the plurality of components 125/225 of character 124/224 to at least another of the plurality of components 125/225 of character 124/224 using linkages 128. As discussed above, after components 125/225 are connected together using linkages 128, designed character 123 is able to make the movement as specified by user 150 inputting pose 227a and pose 227b.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:
1. A device comprising:
a memory storing a software application; and
a processor configured to execute the software application to:
receive a plurality of components for a character, the plurality of components including at least a first component and a second component;
receive a movement for the character, the movement including a first pose for the character and a second pose for the character;

select a type of mechanical linkage from a plurality of types of mechanical linkage, based on the movement, for connecting the first component and the second component; and generate an updated character by connecting the second component to the first component using a new mechanical linkage having the selected type of mechanical linkage, wherein the new mechanical linkage includes at least one of a trimmer and a propagation mechanism;

wherein when the new mechanical linkage is one of the trimmer and the propagation mechanism, the new mechanical linkage includes a first bar and a second bar, and wherein to calculate the new mechanical linkage, the processor is further configured to execute the software application to:

determine a first point on the first component and a second point on the second component such that a distance between the first point and the second point increases monotonically between the first pose and the second pose; and calculate a first length for the first bar and a second length for the second bar based on the distance between the first point and the second point;

wherein when the new mechanical linkage is the trimmer, the new mechanical linkage restricts a first motion of the second component with respect to the first component, and wherein when the new mechanical linkage is the propagation mechanism, the new mechanical linkage generates a second motion of the second component with respect to the first component.

2. The device of claim 1, wherein the new mechanical linkage includes a connector, and wherein the connector defines a third motion of the second component with respect to the first component.

3. The device of claim 2, wherein the connector includes at least one of two parallel bars, two crossed bars, and two bars that come together at a point on the second component.

4. The device of claim 1, wherein when the new mechanical linkage includes the trimmer, the first motion corresponds to the movement of the character.

5. The device of claim 1, wherein to generate the updated character by connecting the second component to the first component using the trimmer, the processor is configured to execute the software application to:

connect a first end of the first bar to the first point on the first component;

connect a second end of the first bar to a first end of the second bar; and connect a second end of the second bar to the second point on the second component.

6. The device of claim 1, wherein to generate the updated character by connecting the second component to the first component using the propagation mechanism, the processor is configured to execute the software application to:

connect a first end of the first bar to the first point on the first component;

connect a second end of the first bar to a first end of the second bar; and connect a second end of the second bar to the second point on the second component.

7. A method comprising:

receiving a plurality of components for a character, the plurality of components including at least a first component and a second component;

receiving a movement for the character, the movement including a first pose for the character and a second pose for the character;

selecting a type of mechanical linkage from a plurality of types of mechanical linkage, based on the movement, for connecting the first component and the second component; and generating an updated character by connecting the second component to the first component using a new mechanical linkage having the selected type of mechanical linkage, wherein the new mechanical linkage includes at least one of a trimmer and a propagation mechanism;

wherein when the new mechanical linkage is one of the trimmer and the propagation mechanism, the new mechanical linkage includes a first bar and a second bar, and wherein to calculate the new mechanical linkage, the method further comprises:

determining a first point on the first component and a second point on the second component such that a distance between the first point and the second point increases monotonically between the first pose and the second pose; and calculate a first length for the first bar and a second length for the second bar based on the distance between the first point and the second point:

wherein when the new mechanical linkage is the trimmer, the new mechanical linkage restricts a first motion of the second component with respect to the first component, and wherein when the new mechanical linkage is the propagation mechanism, the new mechanical linkage generates a second motion of the second component with respect to the first component.

8. The method of claim 7, wherein the new mechanical linkage includes a connector, and wherein the connector defines a third motion of the second component with respect to the first component.

9. The method of claim 8, wherein the connector includes at least one of two parallel bars, two crossed bars, and two bars that come together at a point on the second component.

10. The method of claim 7, wherein when the new mechanical linkage includes the trimmer, the first motion corresponds to the movement of the character.

11. The method of claim 7, wherein to generate the updated character by connecting the second component to the first component using the trimmer, the method comprises:

connecting a first end of the first bar to the first point on the first component;

connecting a second end of the first bar to a first end of the second bar; and connecting a second end of the second bar to the second point on the second component.

12. The method of claim 7, wherein to generate the updated character by connecting the second component to the first component using the propagation mechanism, the method comprises:

connecting a first end of the first bar to the first point on the first component;

connecting a second end of the first bar to a first end of the second bar; and connecting a second end of the second bar to the second point on the second component.

* * * * *

UNITED STATES PATENT AND TRADEMARK OFFICE
CERTIFICATE OF CORRECTION

PATENT NO. : 9,600,921 B2
APPLICATION NO. : 14/547877
DATED : March 21, 2017
INVENTOR(S) : Thomaszewski et al.

It is certified that error appears in the above-identified patent and that said Letters Patent is hereby corrected as shown below:

On the Title Page

Item (73), Assignee: "Disney Enterprises, Inc., Burbank, CA (US)" should be changed to -- Disney Enterprises, Inc., Burbank, CA (US), and ETH Zürich (Eidgenössische Technische Hochschule Zürich), Zürich (CH) --

Signed and Sealed this
Second Day of April, 2019

Andrei Iancu
*Director of the United States Patent and Trademark Office*